(No Model.)
J. W. WILLARD.
ANTIRATTLER FOR THILL COUPLINGS.
No. 561,188. Patented June 2, 1896.
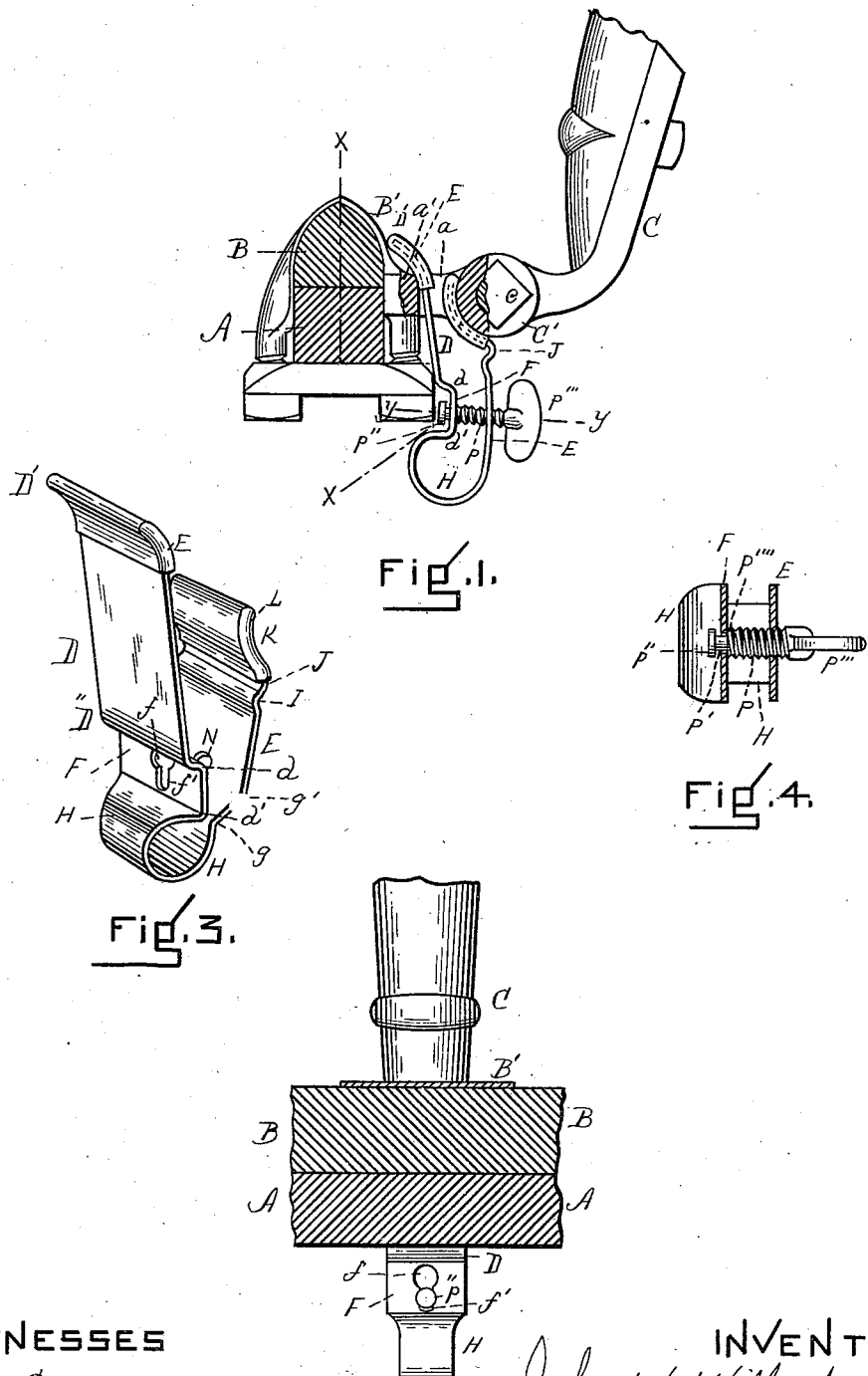

UNITED STATES PATENT OFFICE.

JOHN W. WILLARD, OF PITTSFORD, VERMONT, ASSIGNOR TO CHARLES G. FARWELL, OF QUINCY, MASSACHUSETTS.

ANTIRATTLER FOR THILL-COUPLINGS.

SPECIFICATION forming part of Letters Patent No. 561,188, dated June 2, 1896.

Application filed May 8, 1895. Serial No. 548,510. (No model.)

*To all whom it may concern:*

Be it known that I, JOHN W. WILLARD, a citizen of the United States, residing at Pittsford, in the county of Rutland and State of Vermont, have invented new and useful Improvements in Antirattlers for Thill-Couplings, of which the following is a specification.

This invention relates to an improvement in devices for taking up the wear and thereby preventing rattling in thill-couplings for vehicles; and it consists in the improved construction hereinafter described, and illustrated in the accompanying drawings, in which—

Figure 1 represents a side elevation of my improved antirattler placed in position, the axle, clip, and a portion of the socket on the thill-iron being represented in transverse vertical section. Fig. 2 is a section taken on line $x$, Fig. 1. Fig. 3 is a perspective view of the antirattler removed. Fig. 4 is a section taken on line $y$, Fig. 1.

Similar letters of reference indicate corresponding parts.

A represents an axle; B, the clip; C, the thill; C', the thill-socket, and $c$ the bolt securing the thill to the lugs $a$, connecting with the axle.

The antirattler consists of a spring-steel plate bent into substantially the form shown—that is to say, into two members D and E. The member D is the one which is next the axle, and the member E is that which is next the thill. The member D has its upper end curved at D' outwardly toward the clip B, and such end is preferably provided with a band or pocket which forms a sheath and covers the member at that point, and hence comes into direct contact with the portion B' which extends over the clip and the portion $a'$ which connects the lugs $a$. The member D is bent inward at D'', thence down at $d$, and again outward at $d'$, thus producing a recessed portion F, which is furnished with a slot consisting of the substantially round portion $f$ and elongation $f'$. From the point $d'$ the member D curves outward again at H, forming a nearly circular bend or loop and narrowing at the point $d'$, and again broadening at the point $g$ on the member E. This broadening ceases at the point $g'$, and the member E is substantially or nearly straight until it reaches the point I, where the said member bends slightly inward, forming a slight horizontal groove, and then outward at J, constituting a horizontal shoulder. From this point the member curves inward and upward on substantially an arc of a circle at K, and this portion is preferably covered and protected by a band or pocket L, made of elastic material, and which comes in direct contact with the socket C' of the thill.

The member E is provided with a screw-threaded perforation N, and a screw P engages the thread in said perforation and extends to the portion F of the member D, and thence, by means of an annular groove or neck P', through the slot $ff'$, said screw being provided on its end with a flange P'' of sufficient diameter to overlap the edges of the elongated portion $f'$ of the slot. The screw is provided with a suitable handle or thumb-piece P'''.

To expand the antirattler—that is to say, to force apart the members—the screw is turned toward the right, thus forcing the member D outward by means of the shoulder P'''' next the groove P'. To contract the antirattler, turn the screw to the left and the flange P'' will draw the member D toward the member E. Thus the screw or bolt P both contracts and expands the device. In order to place the device in the position indicated in Fig. 1, it is sufficiently contracted, and then after having been placed in such position is expanded sufficiently to prevent its dropping or escaping. When in such position, the curved portion or lip D' of the member D, which may be protected or not, as desired, by the elastic pocket or band, bears against the portions B' and $a'$, as above described, and prevents the member D from slipping down, and the curved portion K, which may be provided or not, as desired, with the pocket or band L, fits and bears against the socket C' of the thill. The lower portion of the antirattler is kept well back toward the axle by means of the shoulder J, which effectually prevents the member E from riding up on the sill. The recessed portion F of the member D provides space for the flange or head P'' of the bolt P, thus allowing the antirattler to be thrown well back toward the carriage and preventing the device from being conspicuous. In assembling the parts the flange or head P″ of the bolt or screw P is passed through the portion $f$ of the slot and moves into the upper portion of the part $f'$ thereof, and then as the device is contracted moves still farther down into the elongation $f'$ and up as the device is expanded. The portion $f'$ therefore not only serves to hold by its edges the head P″, but also provides for vertical play thereof.

The spring or bend at H is of suitable size and strength, determined by the thickness and the width of the metal and the size of its curvature, to enable the antirattler to be put into the shaft-coupling without setting or breaking.

The spring is preferably tempered with the screw in position at the greatest spread that will be ever required in the shaft-coupling to stop the rattle. The screw or bolt enables the members to be readily drawn together, so that the spring can be inserted without the use of any mechanical appliances, and the spring is so formed that the screw can be turned to a point where the natural spring of the antirattler relieves the pressure from the screw and holds the device in position upon the shaft-coupling.

The rubber bands or pockets K are intended to produce the peculiar and desirable "dead" affect which is the result of the combination of a metallic and a rubber spring.

The entire device can be cheaply and quickly made, easily inserted, withdrawn, and adjusted, and is not liable to get out of repair.

Having thus fully described my invention, what I claim, and desire to secure by Letters Patent, is—

1. An antirattler for thill-couplings, comprising a piece of sheet metal bent back upon itself into two members, and a bolt or screw extending from one member into engagement with the other and adapted by such engagement to contract or expand the antirattler, that is to draw the members toward each other or force them apart, as desired, substantially as set forth.

2. An antirattler for thill-couplings, comprising a piece of sheet metal bent back upon itself into two members, one member being provided with a screw-threaded hole and the other with a plain hole, and the bolt or screw P engaging in the threaded opening in the one member and provided with an annular groove P′ and head or flange P″ whereby the other member is engaged by reason of said grooved portion lying in the plain hole therein and is adapted to be forced inward by said head or flange and outward by the shoulder P″″ produced by the forming of said annular groove, substantially as described.

3. The herein-described improved antirattler, comprising the member E provided with the threaded hole N, the member D provided with the plain hole $f$ elongated into the extension $f'$, and the bolt or screw P provided with the annular groove P′ and head or flange P″, said screw engaging with the threaded opening N and extending by means of said annular groove through the opening $f f'$, said opening being large enough to allow of relative vertical play by the screw and having its extension narrow enough to allow the edges of the said flange or head to overlap the edges of said extension, substantially as set forth.

4. The herein-described improved antirattler, comprising a piece of sheet metal bent back upon itself into two members D and E, and a bolt or screw connecting said members and adapted to contract or expand the same, the said member D which, when the antirattler is in position, is at the rear, that is to say, nearer to the axle, being formed with the forward or inward bend $d$ and rearward or downward bend $d'$ whereby a recess F is formed at the point where the said bolt or screw engages said member D, whereby space is afforded for the projecting end or head of said bolt or screw without preventing the antirattler from lying or extending rearward toward the axle, substantially as described.

5. In an antirattler consisting of a plate bent into two members, the combination with one or both of said members, of an encircling band or sheath constructed of elastic material and applied to the upper end of said member, whereby said elastic band or sheath is interposed between said member and the carriage, substantially as described.

JOHN W. WILLARD.

Witnesses:
HENRY W. WILLIAMS,
E. A. WOODBURY.